United States Patent [19]

Glasstetter et al.

[11] 4,351,815

[45] Sep. 28, 1982

[54] BATTERY CARBON BLACK

[75] Inventors: Fred E. Glasstetter, Yardley, Pa.; Frank J. Eckert, Monroe, La.

[73] Assignee: Columbian Chemicals Company, Tulsa, Okla.

[21] Appl. No.: 232,321

[22] Filed: Feb. 6, 1981

Related U.S. Application Data

[63] Continuation-in-part of Ser. No. 47,960, Jun. 11, 1979, abandoned.

[51] Int. Cl.$^3$ .............................................. C09C 1/48
[52] U.S. Cl. .................................. 423/445; 106/307; 423/460; 429/232
[58] Field of Search ............... 423/445, 460, 450, 451, 423/455, 456; 106/307; 429/232

[56] References Cited

U.S. PATENT DOCUMENTS

| | | | |
|---|---|---|---|
| 3,253,890 | 5/1966 | Deland et al. | 423/455 |
| 3,342,554 | 9/1967 | Jordan et al. | 423/445 |
| 3,408,164 | 10/1968 | Johnson | 423/460 |
| 4,013,759 | 3/1977 | Giet | 423/445 |
| 4,279,880 | 7/1981 | Giet | 423/445 |

FOREIGN PATENT DOCUMENTS 51-80933  7/1976  Japan ................................. 429/232

OTHER PUBLICATIONS

"Encyclopedia of Industrial Chemical Analysis", vol. 8, 1969, pp. 179 & 196.

*Primary Examiner*—Edward J. Meros
*Attorney, Agent, or Firm*—Donald L. Traut; Walter M. Benjamin

[57] ABSTRACT

Carbon black products useful as an ingredient in dry cell battery compositions are disclosed which have a wide aggregate size distribution with a range of measured aggregate volume from about $5 \times 10^4$ to about $1 \times 10^9$ nm$^3$, a geometric mean aggregate volume (Log Vg, nm$^3$) of about 6.2 to about 7.5, geometric standard deviation (for Log Vg, nm$^3$) of about 0.7 to about 1.0, a dibutyl phthalate absorption ranging from about 210 to about 270 cc/100 g., a nitrogen surface area ranging from about 30 to about 60 m$^2$/g, an average stacking height ($L_c$) of ordered graphitic layer segments ranging from about 2.7 to about 3.7 nm. Novel furnace carbon blacks are disclosed which have the same characteristics but have an average stacking height (Lc) of ordered graphitic layer segments ranging from about 1.6 to about 3.7 nm.

9 Claims, No Drawings

BATTERY CARBON BLACK

BACKGROUND OF THE INVENTION

This is a continuation-in-part of U.S. patent application Ser. No. 47,960 filed June 11, 1979, now abandoned.

The present invention pertains to carbon black and more particularly pertains to carbon blacks which can be used as ingredients in dry cell battery compositions.

It is well known that carbon blacks are included in dry cell battery compositions in order to impart increased electrolyte capacity, improved discharge characteristics and other desirable properties to the battery compositions. In the past, acetylene type blacks were the carbon blacks of choice for battery formulation since they imparted the best balance of properties to battery compositions which contained them.

It is also known in the prior art to treat carbon black in an inert atmosphere at temperatures ranging from about 1000° to about 2800° C. and observe crystal growth, W. V. Kotlensky and P. L. Walker, *Proc. 4th Conf. on Carbon,* 1960, P. 423. Average values for the stacking height ($L_c$) of ordered graphitic layer segments (described as "crystallites" in this and other early literature references) ranging from about 1.6 to about 14.8 nm were attained by heating carbon blacks having average particle diameters ranging from about 10 to about 560 nm (and DBPA's by today's standards ranging from about 35 to about 230 cc/100 g.)

Prior art also includes U.S. Pat. No. 4,061,719 which discloses a carbon black useful in depolarization of masses of dry cell batteries. The black has a nitrogen area of between 100–1000 m²/g and a mean particle size of 25 to 65 microns (sic, most probably 25–64 nm). The process for production of such a black includes heating the black to a temperature of between 1100° C. to 2200° C. for a period of 2 to 30 minutes under an atmosphere of nitrogen, hydrogen or carbon dioxide.

SUMMARY OF THE INVENTION

It is therefore an object of this invention to provide a carbon black which can be used in dry cell battery compositions.

Another object of this invention is to provide a carbon black which, when subsequently heat treated, imparts properties to a dry cell composition which are unexpectedly and surprisingly superior to the properties imparted by known acetylene blacks.

Another object of this invention is to provide an oil furnace carbon black which, when subsequently heat treated, imparts properties to a dry cell composition which are superior to the properties imparted by previously known oil furnace carbon blacks.

These and other objects will become apparent to those skilled in the art as the following description proceeds.

Broadly, this invention is a carbon black useful as an ingredient in dry cell battery compositions having a wide aggregate size distribution with a range of aggregate volume (V) from about $5 \times 10^4$ to about $1 \times 10^9$ nm³ (ASTM D 3849-80, procedure A), a geometric mean aggregate volume (Log Vg, nm³) of about 6.2 to about 7.5, geometric standard deviation (for Log Vg, nm³) of about 0.7 to about 1.0, dibutyl phthalate absorption (DBPA) between about 210 and about 270 cc/100 g, a nitrogen surface area between about 30 and about 60 m²/g. and an average stacking height ($L_c$) for ordered graphitic layer segments between about 2.7 and about 3.7 nm, and preferably between about 3.0 and 3.7 nm. For oil furnace carbon blacks an average stacking height ($L_c$) for ordered graphitic layer segments between about 1.6 and 3.7 nm, preferably between about 2.0 and 3.7 nm, and even more preferably between about 2.7 and 3.7 nm.

DETAILED DESCRIPTION OF THE INVENTION

The composition of matter of this invention is a carbon black useful as an ingredient in a dry cell battery composition which broadly comprises a carbon black having a wide aggregate size distribution with a range of aggregate volume (V) from about $5 \times 10^4$ to about $1 \times 10^9$ nm³, a geometric mean aggregate volume (Log. Vg. nm³) of about 6.2 to about 7.5, a geometric standard deviation (for Log Vg, nm³) of about 0.7 to about 1.0, a DBPA between about 210 and about 270 cc/100 g., a nitrogen surface area between about 30 and about 60 m²/g. and an $L_c$ between about 2.7 and 3.7 nm, and preferably between about 3.0 and 3.7 nm. For oil furnace carbon blacks, this invention is a carbon black with an $L_c$ between about 1.6 to about 3.7 nm, preferably between about 2.0 and 3.7 nm and even more preferably between about 2.7 and 3.7 nm.

It is not known but it is thought and preferred that the carbon black has a bimodal and broad aggregate size distribution, a DBPA of about 250 cc/100 g, and a nitrogen surface area of between 40 and 50 m²/g.

Though not restricted thereto, a carbon black having the above desirable characteristics can be produced from a carbon black feedstock produced in a vertical, circular cross section furnace, of the general type described in U.S. Pat. No. 2,779,665, which is hereby incorporated by reference, by a process generally described and illustrated in U.S. Pat. No. 3,253,890, which is hereby incorporated by reference.

The above-mentioned furnace and process is adjusted to produce a carbon black feedstock having the following characteristics:

| | |
|---|---|
| Range of $V_3$ nm³ | $5 \times 10^4$–$1 \times 10^9$ |
| Log Vg, nm³ (geometric mean) | 6.2–7.5 |
| Geometric Standard Deviation (for Log Vg, nm³) | 0.7–1.0 |
| DBPA, cc/100 g. | 200–250 |
| Suface area, BET, m²g | 30–60 |
| Volatile Content, % | 0.5–2.0 |

Preferably, the carbon black feedstock has the following characteristics:

| | |
|---|---|
| Range of $V_3$ nm³ | $5 \times 10^4$–$5 \times 10^8$ |
| Log Vg, nm³ (geometric mean) | 6.3–6.8 |
| Geometric Standard Deviation (for Log Vg, nm³) | 0.75–0.85 |
| DBPA, cc/100 g. | 210–230 |
| Surface Area, BET, m²/g | 40–50 |

The carbon black feedstock is fed with an inert gas carrier into a heating zone. The carrier contains minimal concentration of oxygen and water. Preferably, the carrier is nitrogen.

The black is heated to between 1400° and 2400° C. or higher if materials permit and discharged. Preferably, the black is heated to about 2200° C. at a rate of between 100° C./sec. and 150° C./sec. for a heating time ranging from 9 sec. to 10 min. Preferably the carbon black is heated from 9 sec. to 5 min. and even more preferably, the carbon black is heated from 9 sec. to 21 sec.

Since generally it is impossible to attain an oxygen-free or water-free atmosphere and since the linings of high temperature furnaces are preferably constructed of graphite, a two zone heating furnace is preferred. In the initial zone, the black is heated to a temperature between 565° C. and 760° C. thereby converting any oxygen present into CO, $Co_2$ or $SO_2$. The zone is constructed of a material such as RA-330 pipe. The heated carbon black at a temperature between 565° C. and 760° C. is fed into the graphite-lined second zone and heated to between 1400° C. and 2400° C. The atmosphere, following the discharge of the black from the furnace and while the black is at temperatures in excess of 315° C. is maintained free of oxygen and water so as to prevent oxidation of the black.

With regard to the production of a suitable carbon black feedstock, it will be apparent to those skilled in the art that such properties as the DBPA of the present carbon black products can be fully regulated over the limits of the claimed ranges by means of known techniques taught in U.S. Pat. No. 3,253,890. DBPA can be regulated by introduction of alkali metal salts in varied amounts into the make oil feedstock. $L_c$ can be regulated by varying the heating rate within the heating furnace and the maximum temperature attained by the carbon black. Surface area can be regulated by varying the flow rate of water into the furnace process and by regulation of temperature within the reaction chamber of the vertical furnace. The relatively low volatile content of the feedstock carbon blacks of this invention is incidental to their surface characteristics and the high temperature at which they are formed and to which they are reheated.

In the following is set forth an example of the invention, which is given by way of illustration and not limitation. The specific concentrations, temperatures, times, ratios, etc. set forth in these examples are not to be construed to unduly limit the scope of the invention.

EXAMPLE I 50 grams/second of a carbon black feedstock exhibiting the following properties:

| | |
|---|---|
| Vog Vg, $nm^3$ (geometric mean) | 6.501 |
| Geometric Standard Deviation (for Log Vg, $nm^3$) | 0.791 |
| DBPA, cc/100g. | 225 |
| Surface area, BET $m^2/g$ | 40 |
| Volatile Content, % | 0.6 |
| Oxygen Content, % | 0.1 |
| $L_c$, nm | 1.2 | were fed with a nitrogen carrier at velocity of 1 meter/sec. through a high temperature treating furnace measuring 13 meters in length and 0.1 meters in diameter. A pressure of 1.1 atm was maintained and the carbon black was discharged at a temperature of 1425° C.

The heat treated carbon black was allowed to cool under an inert atmosphere following recovery thereof and on testing was found to have the following properties:

| | |
|---|---|
| Log Vg (geometric mean) | 6.516 |
| Geometric Standard Deviation (for Log Vg, $nm^3$) | 0.782 |
| DBPA, cc/100g. | 250 |
| Surface Area, BET, $m^2/g$ | 45 |
| Volatile Content, % | 0.2 |
| $L_c$, nm | 2.8 |
| Iodine Number | 62 |
| ABC Color | 89 |
| Tinting Strength (ASTM-D3265 79) | 57 |

Acetylene black, (Shawinigan, Inc.) which had previously been the dry cell battery black of choice was utilized in preparation of a standard dry cell battery composition. This acetylene black was characterized by the following properties:

| | |
|---|---|
| Log Vg, $nm^3$ (geometric mean) | 6.625 |
| Geometric Standard Deviation (for Log Vg, $nm^3$) | 0.646 |
| DBPA, cc/100g. | 235 |
| Surface Area, BET $m^2/g$ | 54 |
| $L_c$, nm | 2.58 |

A second dry cell battery composition was prepared substituting the heat treated black of this Example in place of the acetylene black. The compositions were identical except for the carbon black constituent.

The properties of the two battery compositions were tested using ANSI specification C18.1-1972 for Light Intermittent Test (Lift) and amperage output and Heavy Intermittent Test (Hift), initially and after 12 weeks at 45° C. The results for the 2D cells were found to be the following:

| | INITIAL | | 12 WKS @ 45° C. | |
|---|---|---|---|---|
| | Acet | Applicant's | Acet | Applicant's |
| 2.25 ohm LIFT. | 100% | 108% | 100% | 107% |
| 2.25 ohm Cont. | 100% | 108% | 100% | 101% |
| 2.25 ohm HIFT | 100% | 107% | 100% | 109% |
| 4.00 ohm LIFT | 100% | 110% | 100% | 113% |
| 4.00 ohm HIFT | 100% | 110% | 100% | 104% |
| 25.00 ohm 4H/D | 105% | 105% | 100% | 102% |

It can thus be seen that the presently claimed heat treated black is found to impart superior properties to battery compositions containing Applicant's black over compositions containing acetylene black.

Therefore, carbon black products have been developed which were heretofore unknown and unobvious in that they are characterized by such as different combination of properties as would have previously caused one skilled in the art to doubt that they could have utility. More particularly, these new blacks are different in being characterized by wider aggregate size distribution and higher average stacking height, $L_c$, of ordered graphitic layer segments.

We claim:

1. A carbon black having a geometric mean aggregate volume (Log Vg, $nm^3$) ranging from about 6.2 to abut 7.5, a dibutylphthalate absorption (DBPA) between about 210 and about 270 cc/100 g, a nitrogen surface area between about 30 and about 60 $m^2/g$ and an average stacking height ($L_c$) of ordered graphitic layer segments ranging from about 2.7 to about 3.7 nm.

2. A furnace black having a geometric mean aggregate volume (Log Vg, $nm^3$) ranging from about 6.2 to about 7.5, a dibutyl phthalate absorption (DBPA) between about 210 and about 270 cc/100 g, a nitrogen surface area between about 30 and about 60 m²/g and an average stacking height ($L_c$) of ordered graphitic layer segments ranging from about 1.6 to about 3.7 nm.

3. The furnace carbon black of claim 1 and having a wide bimodal aggregate size distribution with a range of aggregate volume from about $5 \times 10^4$ to about $1 \times 10^9$ nm³ and a geometric mean standard deviation of about 0.7 to 1.0 for a geometric mean aggregate volume (Log Vg, nm³) ranging from about 6.2 to about 7.5.

4. The furnace black of claim 1 or 2 wherein the nitrogen surface area is between 40 and 50 m²/g.

5. The carbon black of claim 1, 2, or 3 wherein the carbon black attained its $L_c$ by being heat treated between 1400° and 2400° C. for 9–21 sec. in an inert atmosphere.

6. The carbon black of claim 1 wherein $L_c$ is between about 3.0 and about 3.7 nm.

7. The carbon black of claim 2 wherein $L_c$ is between about 2.0 and about 3.7 nm.

8. The carbon black of claim 2 wherein $L_c$ is between about 3.0 and about 3.7 nm.

9. The carbon black of claim 1 or 2 wherein the geometric standard deviates (Log Vg, nm³) is between 0.7 and 1.0.

* * * * *